United States Patent [19]

Baker et al.

[11] Patent Number: 4,498,145
[45] Date of Patent: Feb. 5, 1985

[54] METHOD FOR ASSURING ATOMICITY OF MULTI-ROW UPDATE OPERATIONS IN A DATABASE SYSTEM

[75] Inventors: Jerry W. Baker, Morgan Hill; Richard A. Crus, San Jose; Donald J. Haderle, Los Gatos, all of Calif.

[73] Assignee: International Business Machines Corporation, Armonk, N.Y.

[21] Appl. No.: 393,967

[22] Filed: Jun. 30, 1982

[51] Int. Cl.³ .................... G06F 7/00; G06F 11/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 4,042,912 | 8/1977 | Bachman et al. | 364/200 |
| 4,130,867 | 12/1978 | Bachman et al. | 364/200 |
| 4,159,517 | 6/1979 | Paradine et al. | 364/200 |

OTHER PUBLICATIONS

Blasgen, et al., "System R: An Architectural Overview", *IBM Systems Journal*, vol. 20, No. 1, 1981, pp. 41-62.
Astrahan, et al., "System R: A Relational Approach to Data Base Management", IBM Research Publication, *Computer Science*, RJ 1738, (#25356), Feb. 27, 1976.
Grey, et al., "The Recovery Manager of a Data Management System", IBM Research Publication, *Computer Science*, RJ 2623, (#33801), Aug. 15, 1979, (See, also, *ACM Computing Surveys*, vol. 13, No. 2, Jun. 1981, pp. 223-242.).
Chamberlin, et al., "Sequel 2: A Unified Approach to Data Definition, Manipulation, and Control", *IBM Journal Research Development*, Nov. 1976, pp. 560-575.
IBM, "SQL/Data System Planning and Administration", IBM Publication SH24-5014-0, Program No. 5748-XXJ, First Edition, Aug. 1981, pp. 9-1 to 9-19, Recovery Considerations.

*Primary Examiner*—Harvey E. Springborn
*Attorney, Agent, or Firm*—Shelley M. Beckstrand; R. Bruce Brodie

[57] ABSTRACT

A method for assuring atomicity of user requested multi-row update operations to tables such as in a relational database, guarantees that for any update operation that succeeds all stated effects will have occurred and that for any update operation that fails the system state as perceived by the user remains unchanged. This is accomplished by establishing, in response to a multi-row update operation request, an execution module of a program containing sets of machine language code instructions implementing the update operation request with a savepoint request at the beginning of the execution module of the program. For each set of machine language code instructions in or called by the execution module which modified the user perceived system state, information is logged to a soft log. Upon completing the execution module of the program, the savepoint is dropped, causing all soft log information recorded since the savepoint to be deleted and releasing all resources held to guarantee restoration of the user perceived system state at the time of the savepoint request. Responsive to the detection of an error during execution of the execution module of the program, the soft logged information is used to restore the user perceived state to that existing at the time of the savepoint request.

6 Claims, 8 Drawing Figures

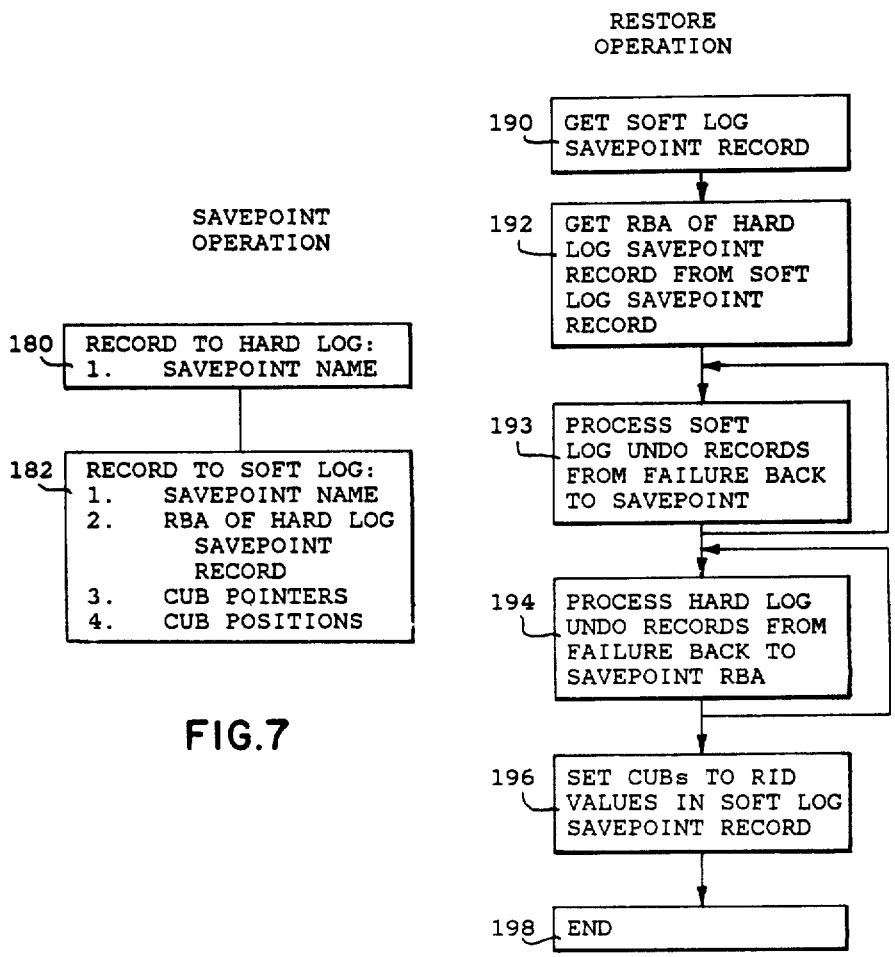

METHOD FOR ASSURING ATOMICITY OF MULTI-ROW UPDATE OPERATIONS IN A DATABASE SYSTEM

BACKGROUND OF THE INVENTION

1. Field of the Invention

This invention relates to a new method for managing a database. More specifically, it relates to a method for assuring atomicity of multi-row update operations such as in a relational database system.

2. Description of the Prior Art

In prior art data management systems, support is sometimes provided for assuring the atomicity of operations effecting a database. Such an operation is "atomic" if the operation either succeeds completely or it fails, in which latter case the state of the database is left unchanged.

The IBM Information Management System (IMS/VS) Version 1 provides support for assuring the atomicity of operations updating one record, or row of a table, at a time. However, there is no multi-row update facility in IMS/VS.

Database management systems which provide multi-row updating operations include those based upon the relational model, such as the IBM Research System R, an experimental database management system, and the IBM Sequel Query Language/Data System (SQL/DS). System R is described in M. W. Blasgen, et al, "System R: An Architectural Overview", *IBM System Journal*, Vol. 20, No. 1, 1981, pages 41–62. The IBM SQL/DS is described in "SQL/Data System Planning and Administration", IBM Publication SH24-5014-0, Program Numbr 5748-XXJ, August 1981, with the recovery considerations set forth at pages 9-1 to 9-19. Hereafter, reference to relational databases will be intended to include all database management models which allow multi-row update operations.

The SQL language, which is the external language for access to databases managed by System R or SQL/DS, provides operations for modifying the state of userdefined data, including UPDATE, DELETE, and INSERT operations which allow the SQL user to insert, update, or delete multiple rows (i.e., records) in a specified database table. As implemented in System R and SQL/DS, SQL allows partial success of such multi-row operations, such that a detected error in the middle of a multi-row UPDATE, for example, will cause termination of the operation with only a subset of the required records updated. This leaves the table in an inconsistent state, and the application program requesting the SQL operation has no practical means of determining exactly which records were or were not updated. If recoverable files are used, a rollback, or recovery operation must be performed when such an error is detected to cause all work within the entire unit of recovery (UR), i.e. transaction, to be undone. Unfortunately, this action not only cancels the effects of the operation causing the error, but also the effects of any other operation in the same unit of recovery. The problem is more serious if non-recoverable files are in use. In such a case the rollback process has no effect, and the application programmer must handle the recovery of the data.

Various proposals have been made to avoid the necessity for backing out a complete transaction in the event of an error during a sequence of multi-row update operations. Thus, it has been suggested to "begin each complex operation with a savepoint and backing up to this savepoint" in the event of a failure during the operation. See, for example, Grey, et al, "The Recovery Manager of a Data Management System", IBM Research Publication, *Computer Science* RJ 2623 (#33801), Aug. 15, 1979. (See also, ACM Computing Surveys, Vol. 13, No. 2, June 1981, pages 223–242.) Grey, in this discussion of the System R, notes that such a savepoint technique was not implemented, but was rather an unsolved language design problem.

SUMMARY OF THE INVENTION

This invention provides a method and apparatus for assuring atomicity of user requested multi-row update operations to tables such as in a relational database, guaranteeing that for any update operation that succeeds all stated effects will have occurred and that for any update operation that fails the system state as perceived by the user remains unchanged. This is accomplished by establishing, in response to a multi-row update operation request, an execution module containing machine language code instructions implementing the update operation request with a savepoint request at the beginning of the execution module. For each set of instructions in or called by the execution module which modifies the user perceived system state, undo information is logged selectively to a hard or soft log. Upon completing the execution module without error, the savepoint is dropped, causing all soft log information recorded since the savepoint to be deleted and releasing all resources held to guarantee restoration of the user perceived system state at the time of the savepoint request. Responsive to the detection of an error during execution of the module, the logged undo information is used to restore the user perceived state to that existing at the time of the savepoint request.

BRIEF DESCRIPTION OF THE DRAWINGS

FIG. 7 is a flow chart illustrating the savepoint operation shown in FIGS. 5 and 6.

FIG. 8 is a flow chart illustrating the restore operation shown in FIGS. 5 and 6.

DESCRIPTION OF THE PREFERRED EMBODIMENT

Figure 1:
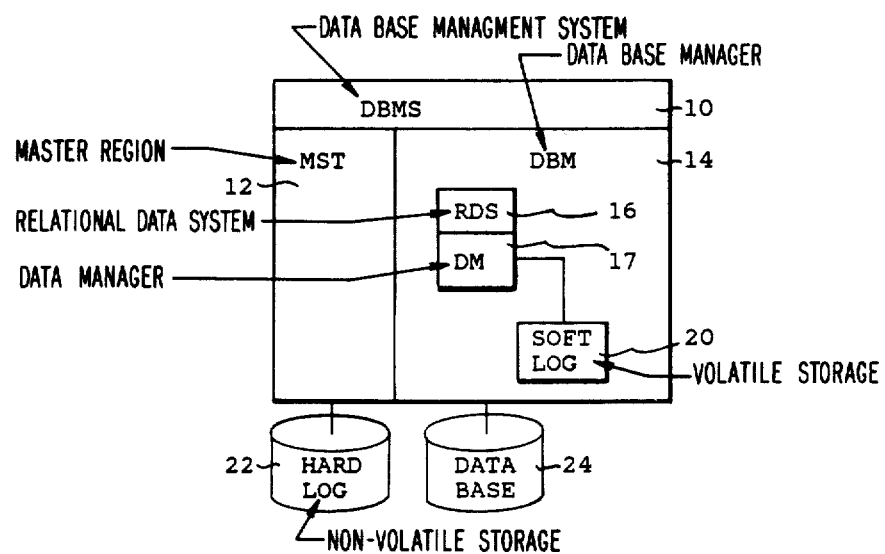
FIG. 1 is a diagrammatic illustration of a database management system including a relational data system, a data manager, and hard and soft logs.

Referring first to FIG. 1, a high level storage map is shown illustrating, for example, two private address spaces in an IBM System/370 Multiple Virtual System implementing a database management system (DBMS)

10. The IBM System/370 architecture is described in IBM System/370 *Principles of Operation*. IBM Publication GA22-7000-6. In this embodiment, by way of example, DBMS 10 includes a master (MST) region 12 and a database manager (DBM) region 14. Hard log 22 is maintained under control of MST 12, as is described in patent applications of E. Jenner, "Method and Apparatus for Restarting a Computing System", Ser. No. 390,163, filed June 21, 1982, and of C. Mellow, et al, "Method and Apparatus for Logging Journal Data in a Continuous Address Space Across Main Storage, Direct Access, and Sequential Access Devices", Ser. No. 390,454, filed June 21, 1982.

Database manager 14 includes a relational data system (RDS) 16 and a data manager (DM) 17 which together manage the creation, modification, access, and deletion of data objects stored in database 24. Such operations may be performed in response to calls from applications or tasks running in allied address spaces (not shown). One approach to establishing connection between such allied address spaces and the facilities provided by DBMS 10 is described in R. Reinsch, "Method and Apparatus for Controlling Intersubsystem Access to Computing Functions and Data", application Ser. No. 393,244, filed June 29, 1982.

The manner in which RDS 16 performs its functions is set forth in further detail in M. W. Blasgen, et al, "System R: An Architectural Overview", *IBM System Journal*, Vol. 20, No. 1, 1981, supra, and in D. J. Haderle, et al "Method and Apparatus for Online Definition of Database Descriptors", application Ser. No. 393,902, filed June 30, 1982.

Figure 3:
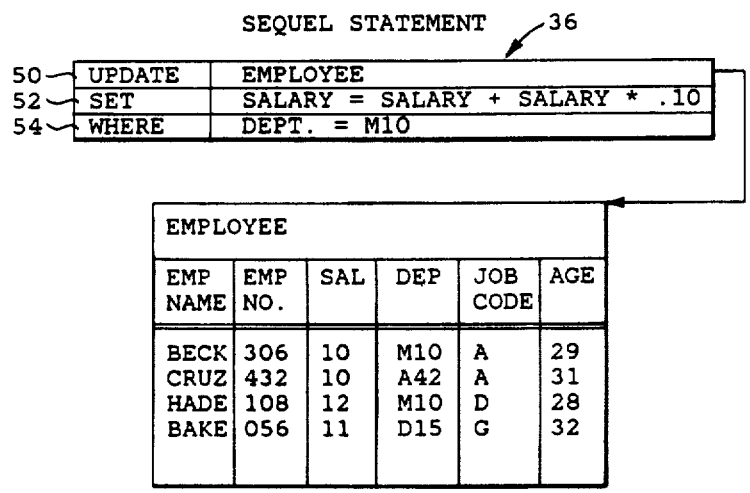
FIG. 3 is a diagram illustrating a typical SQL statement.

In FIG. 3 is set forth a typical SQL statement or request 36, illustrating a command field 50, showing that an UPDATE is to be made to the file named EMPLOYEE, an operation field 52, showing that the SALARY field is to be incremented by 10%, and the selection criteria field 54, showing that the salary field is to be updated for those employees in department M10. The selection field 54 includes one or more predicates, a term which will be further described hereafter.

RDS 16 processes a SQL statement received from an application running in an allied address space into control blocks necessary to invoke the data manager 17 component within DBM 14 and into an execution module. Each execution module comprises a set of machine language instructions which implement the SQL statement being processed. The execution module will include calls to a defined set of protocols in data manager 17 for retrieving and modifying the data in database 24. (This set of protocols means manipulative system input and is referenced as MSI.)

Figure 4:
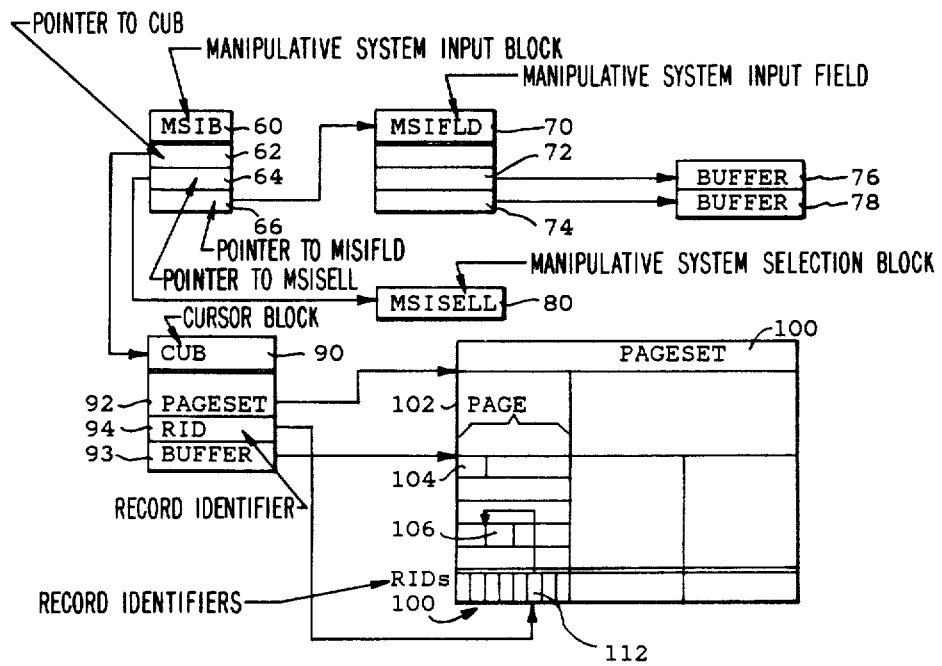
FIG. 4 is a diagrammatic illustration of various control blocks and data areas comprising the apparatus of the invention and referenced in executing the method of the invention.

Referring now to FIG. 4, a description will be given of various control blocks of a program passed to the DBM 14 data manager from an execution module of a program for data manipulation operations, including SQL INSERT, UPDATE, DELETE operations. Illustrated in FIG. 4 are manipulative system input block (MSIB) 60, manipulative system input field (MSIFLD) 70, manipulative system selection block (MSISELL) 80, cursor block (CUB) 90, and pageset 100. MSIB 60 is the main anchor control block, and includes pointer 62 to CUB 90, pointer 64 to MSISELL 80, and pointer 66 to MSIFLD 70. CUB 90 contains information which identifies the position of the scan in the page set 100. This information includes, among other things, a code which identifies the type of cursor block, pageset 100 identifier 92, and record identifier (RID) number 92 which identifies the RID slot 112 of RIDs 100 which contains a pointer into page 102 to the record 106 to which the scan is positioned. MSISELL 80 specifies "sargable" predicates. Sargable predicates are predicates which have meaning to the data manager component of DBM 14. Non-sargable predicates are predicates which the data manager component cannot handle, and must be checked by RDS 16. MSISELL 80 includes the identifier of the field to which the predicate applies; the operation code of a comparison operator (greater than, less than, equal or greater than, equal or less than, not equal); a pointer to the value to be compared; and any boolean connectors, such as AND, OR. Each MSISELL 80 is used to specify one predicate. Multiple predicates are specified by using a plurality of MSISELLs and the boolean connector field. MSIFLD 70 specifies fields for which values are returned or supplied, and includes the identifier of the field; the field data type; the field length; and a pointer to related buffers 76, 78.

Figure 2:
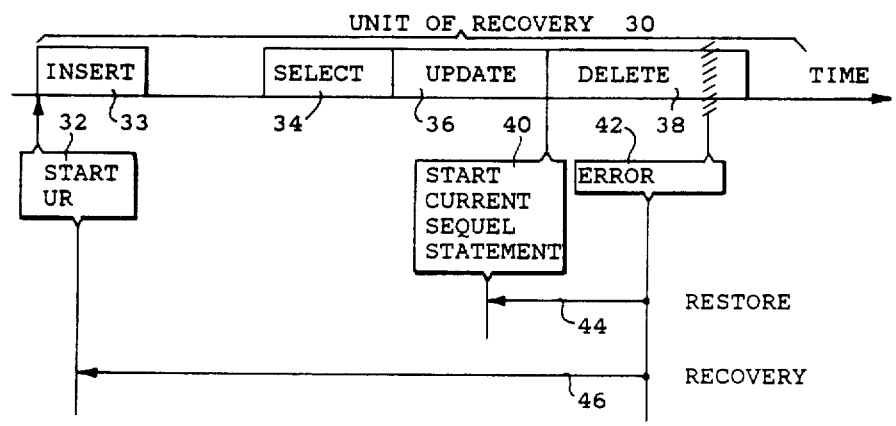
FIG. 2 is a diagrammatic illustration of a typical unit of recovery, distinguishing recovery and restore operations.

Referring now to FIG. 2, a transaction comprising a plurality of SQL statements 33, 34, 36, and 40 is illustrated as a unit of recovery 30. A unit of recovery (UR) is the work done by a process which affects the state of one or more recoverable resources 24 from one point of consistency to another. The scope of a UR may include multiple execution modules of a program. The UR 30 of FIG. 2 includes the execution modules which implement SQL statements 33, 34, 36 and 40. The start of the UR is at 32, the beginning of INSERT statement 33, and extends in time to a point beyond the current SQL DELETE statement 38, which begins at point 40. Assume that an error occurs at 42, during execution of a multi-row DELETE operation 38, which is not a system crash or some other loss of volatile storage (including soft log 20). By this invention, a restore operation is provided which restores the database to its point at the beginning 40 of the current SQL statement 40, without impacting changes made within this same UR 30 by, say, SQL UPDATE statement 36. Without this invention, a recovery operation 46 utilizing hard log 22, such as is described in the copending Jenner application, would be necessary. (If the error results in loss of soft log 20, then the recovery operation of Jenner would still be available to recover the database to its state at start UR 32.)

Thus, in performing the procedures of this invention, DM 17 utilizes soft log 20 in main storage and the hard log 22 on a direct access storage device (DASD). Each time a change is made to a data object in a database 24, DM 17 writes or stores a record or records in the hard or soft log. Hard log 22 is used if the pageset is recoverable and if the page containing the update may have been copied to DASD 24. The pageset is considered to be recoverable if the effects of committed changes are guaranteed to survive system failures by DBMS 10. Soft log 20 is used if the pageset is not recoverable or if the page is guaranteed not to have been copied to DASD 24. Each record on hard log 22 representing a change to database 24 includes the following three fields: (1) hard log header, (2) data manager log header, and (3) appendage. The hard log header includes a field specifying the log record type and a field containing a pointer to the previous hard log record. The data manager log header includes the following four fields:

1. A pageset identifier field which identifies the pageset to which the change is made. In this example, a pageset is a set of one to 32 data sets which are logically concatenated to form a linear address space of up to 2**32 bytes. A data set is a specific portion of DASD storage 24 which is read from and written to via the MVS operating system.

2. A page identifier field which identifies the page in the pageset being changed. In this example, a page is a 4096 or 32768 byte contiguous area in a pageset which begins on a 4096 or 32768 byte boundary.

3. A field identifying the DBM 14 data manager 17 procedure which is making the change.

4. A flag indicating whether the hard log record contains UNDO, REDO or UNDO/REDO information. UNDO information is that information required to reverse an update operation in order that it appear that the operation was never performed. REDO information is that information required to re-perform an update operation.

The appendage format depends upon the type of modification. In some cases the appendage will contain before and after images of the data object being changed, and in other cases the appendage will contain information necessary to conduct a reversing operation.

Each time a change is made to a data object in a non-recoverable database 24 and each time a savepoint is established, DM17 stores a soft log record in soft log 20. A soft log 20 record includes the following:

1. A soft log record header, which includes (a) a pointer to the previous soft log 20 record, (b) the length of this log record, and (c) an operation code identifying the log record type.

2. An appendage whose format depends on the log record type. If the log record is for a data change then the appendage will contain UNDO information. If the log record describes a savepoint, then the appendage will contain the following:

1. A user supplied savepoint name.

2. A pointer to the previous savepoint soft log 20 record.

3. The relative byte address (RBA) of the first hard log 32 record written by the savepoint module writing this soft log record.

4. A list of entries describing cursor blocks (CUBs) whose positions are to be saved, including (a) the record identifier (RID) contained the CUB and (b) the position of the CUB (i.e. CUB position WRT record: before, at, after). A cursor block (CUB) is a DM 17 control block used to maintain position on a row or record in a database. Each CUB represents, among other things, positions within data manager objects such as indexes and page sets 100.

Now, by way of explanation of the operation of the above control blocks and modules, the atomicity protocol of the invention is implemented using a savepoint/restore mechanism by the data manager component of DBM 14. These two operations enable any user of the data manager to return the state of database 24 to a predefined point 40 (a savepoint) within UR 30, negating any effects of any modifications which occurred after that point 40.

Figure 5:
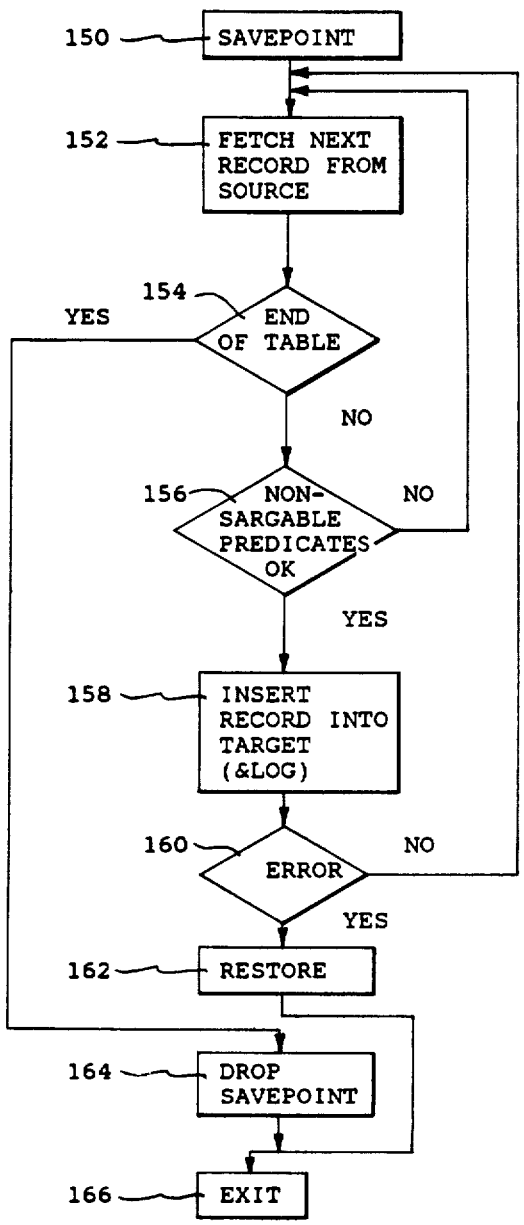
FIG. 5 is a flow chart illustrating the procedures executed by an execution module implementing an INSERT operation.
Figure 6:
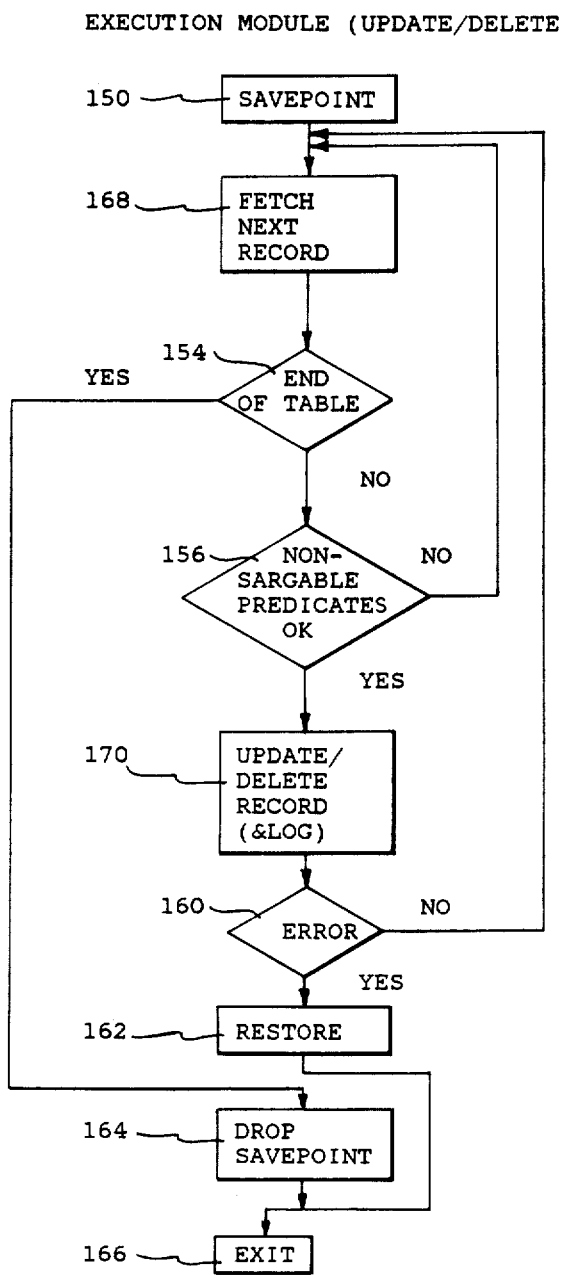
FIG. 6 is a flow chart illustrating the procedures executed by an execution module implementing an UPDATE or DELETE operation.

Each execution module which implements a SQL multi-row UPDATE, INSERT, or DELETE utilizes the savepoint and restore operations to guarantee atomicity. These execution modules are set forth in FIGS. 5 and 6. The execution module for update/delete of FIG. 6 is also set forth in pseudo code in Table 3. At the beginning of the execution module, before any database 24 change is made, a savepoint command 150 (see also FIG. 7) is issued to the data manager component of DBM 14. As input to this operation, a name, unique within the UR 30, is passed which identifies the savepoint 150 (for the example of FIG. 2, this would be point 40, at the start of the current SQL statement 38), and a list of cursor blocks 90 whose states are to be saved. Table 4 sets forth the create savepoint procedure in pseudo code.

If an error 160 (42) is detected by the execution module (FIG. 5 or 6), then a restore 162 is issued (as is illustrated in FIG. 8) in which the name specified on the savepoint operation 150 is passed as a parameter. Restore 162 returns the state of all user and system data to what it was at the point 40 at which the savepoint 150 was issued, according to the method set forth in FIG. 8 and Table 5, including the steps of getting 190 the soft log 20 savepoint 150 record; getting 192 from the soft log record the RBA of the hard log 22 savepoint 150 record; processing 194 hard log 22 UNDO records from failure 42, 160 back to the savepoint 150 RBA 40; and setting 196 CUBs 90 RDI 94 values to the positions which existed at the savepoint 40, 150.

All execution modules which implement SQL operations which change the state of database 24 use the savepoint 150 and restore 162 operations to insure atomicity. Other SQL operations which are interpreted (such as definitional and authorization statements) rather than having compiled code generated utilize the same approach. That is, a savepoint 150 is issued before any database 24 change is made and a restore 162 is issued if an error is detected after any such database change. The net effect of this implementation is that the SQL user perceives all operations to be atomic, either succeeding completely or leaving database 24 unchanged.

Thus, soft log 20 is created in volatile storage for each unit of recovery and is managed on a last-in first-out (LIFO) basis. When the data manager 17 component of DBM 14 is required to make any change to a CUB 90 or to a non-recoverable data page or to a recoverable page which is guaranteed not to have been copied to DASD 24, it inserts a record into the soft log 20 for the unit of recovery (UR) requesting the change. This record contains precisely the information required to undo the effects of the modification to the CUB 90 or data page 102. The name of the module to be invoked to accomplish the undo operation is also specified in the soft log 20 record. The hard log 22 is used to record both UNDO and REDO information for changes made to data pages 102 which may have been copied to DASD 24 and REDO only information for pages which are guaranteed not to have been copied to DASD.

If an execution module (FIG. 5 or 6) in a UR 30 issues a savepoint 150 command then a special record with the specified savepoint name is inserted into both soft log 20 and hard log 22. If a restore 162 is issued then the UNDO records are read and removed from both logs 20, 22 in LIFO order 44, and the described operations performed until the savepoint 150 record containing the name specified on the restore 162 is found.

It is also possible for multiple savepoints 150 to be stacked by a UR 30. Consider, for example, a UR which has issued two savepoint 150 commands with no restore 162 command between them. The contents of the soft log 20 would appear as in Table 1: Stacked Savepoints.

TABLE 1
STACKED SAVEPOINTS

SAVEPOINT SP1
undo-record-1
undo-record-2
.
.
undo-record-i
SAVEPOINT SP2
undo-record-i+1
undo-record-i+2
.
.
undo-record-k At this point, the UR could issue RESTORE SP2, which would back out all changes to the database 24 made since savepoint SP2. The soft log 20 would then contain the information set forth in Table 2: Stacked Savepoints With Restore.

TABLE 2
STACKED SAVEPOINTS WITH RESTORE

SAVEPOINT SP1
undo-record-1
undo-record-2
.
.
undo-record-i

If, however, RESTORE SP1 was issued, then all records of soft log 20 are processed and deleted.

In order to enhance the efficiency of the UNDO process, the data manager component of DBM 14 may adopt the strategy that each soft log 20 record describes a change to a single page 102 of storage and that this change can be applied using only information contained in the page 102 and the log 20,22 record. Thus, no other pages, directories, or catalogs need to be accessed to accomplish UNDO.

The data manager component of DBM 14 simplifies the atomicity protocol of the invention by providing an operator which allows other components to write records in soft log 20 or in hard log 22. Thus, modifications to resources managed by other components can be backed out with this mechanism. The data manager component of DBM 14 also uses soft log 20 and hard log 22 to guarantee the atomicity of its own operations. Thus, any component using the data manager component of DBM 14 need not be concerned with the consistency of data 24 between calls.

Soft log 20 is the critical component for this preferred embodiment of the atomicity protocol of the invention because it provides a centralized mechanism for managing the information required to undo changes to user and system data.

TABLE 3
UPDATE/DELETE EXECUTUIN MODULE

```
10 Establish Savepoint (call DM)
12 error=no;
14 rnf=no;
16
18 DO UNTIL rnf=yes or error=yes;/*repeat until*/
19 /*last record or error occurs*/
20 fetch next record;/*call to DM passing MSIB*/
22 If record not found
24 THEN rnf=yes;
26 ELSE
```

TABLE 3-continued
UPDATE/DELETE EXECUTUIN MODULE

```
28  IF error returned by DM
30  THEN error=yes
32  ELSE
34  check non-sargable predicates;
36  IF non-sargable predicates satisfied THEN
38  DO; /*record satisfies all SQL predicates*/
40  update/delete record /*call to DM*/
41  /*passing MSIB*/
42  IF error returned by DM
44  THEN error=yes;
46  ELSE;
48  END;
50  ELSE;
52  END; /* or DO UNTIL rnf=yes or error=yes*/
54
56  IF err=yes
58  THEN restore savepoint;/*call to DM passing SVPT block*/
60  ELSE drop savepoint;/*call to DM passing SVPT block*/
62
64  RETURN;
66  END;
```

TABLE 4
CREATE SAVEPOINT (SVPT)

```
80   Compute length of appendage of soft log record.
82   If some or all CUBs to be saved THEN
83   DO.
84   Case of all CUBs to be saved.
85   DO for all CUBs.
86   Add contribution to soft log record for CUB if
88   it is recoverable.
90   END.
92   Change all lock durations to commit.
94   END case.
96   Case of some CUBs to be saved.
98   DO for all CUBs to be saved.
100  IF CUB to be saved and it is recoverable THEN
102  DO.
104  Add contribution to soft log record for CUB.
106  IF page lock held by CUB change the lock
108  duration to commit to guarantee the
110  page can be re-accessed during restore.
112  IF index leaf lock held by CUB change the
114  lock duration to commit to guarantee the
116  page can be re-accessed during restore.
118  END.
120  END.
122  END case.
124  END
126  IF UR is recoverable THEN write a savepoint hard log
128  record.
130  Write a savepont soft log record.
132  Increment count of outstanding savepoints.
134  Add to the soft log the CUB flags and position
136  information for all CUBs to be saved.
```

TABLE 5
RESTORE SAVEPOINT

```
200  Search the chain of savepoint log records in the
202  soft log backwards until the savepoint
204  with the name = supplied name is found.
206  DO for each record in the soft log UNTIL the
208  savepoint record is reached beginning with
210  the last record in the soft log.
212  IF the record is not a savepoint record THEN
214  Invoke the UNDO routine for the records.
216  ELSE
218  DO.
220  DO for each CUB that was saved.
222  IF the CUB has a buffer THEN
224  Free it.
225  Move from the soft log record to the
226  CUB the flags and position information
228  that was saved.
230  Decrement count of outstanding savepoints.
232  END.
```

TABLE 5-continued
RESTORE SAVEPOINT

```
234  END.
236  Get the address of the previous record in the
238  soft log.
240  END.
242  IF the UR is recoverable THEN
244  Save the log RBA of the hard log savepoint
246  record.
248  Reset the soft log to the beginning of the
250  savepoint record which was restored to.
252  IF the UR is recoverable THEN
254  DO.
256  DO for each UR-related record in LIFO order.
258  UNTIL the log RBA - RBA of the hard log
260  savepoint record.
262  IF the record contains UNDO information
263  THEN
264  Invoke the UNDO procedure to process
266  the record.
268  END.
270  END.
```

TABLE 6
DROP SAVEPOINT

```
300  If no savepoint is outstanding then
302  return error code.
304  Locate the last savepoint log record.
306  Reset the soft log to the beginning
308  of the savepoint record.
310  Decrement count of outstanding
312  savepoints.
```

We claim:

1. A method for assuring atomicity of user requested multi-row update operations to tables in a relational database, guaranteeing that for any update operation that succeeds all stated effects will have occurred and that for any update operation of the type including UPDATE, INSERT, and DELETE that fails, the system state as perceived by the user remains unchanged, comprising the steps of:

in response to an update operation request, establishing an execution module of a program containing sets of machine language code instructions implementing the update operation request with a savepoint request at the beginning of the execution module of the program;

for each set of machine language code instructions in or called by the execution module of the program which modifies the user perceived system state, selectively recording in a soft or hard log information required to reverse the update operation in order that it appears that the operation was never performed;

upon completing the execution module of the program, dropping the savepoint and causing all soft log information recorded since the savepoint to be deleted, and releasing all resources held to guarantee restoration of the user perceived system state at the time of the savepoint request;

upon detecting an error and responsive to the information selectively recorded in the soft or hard log, restoring the user perceived state to that at the time of the savepoint request.

2. A method of operating a computing system including a database management system which provides for multi-row update and related savepoint recovery request operations with respect to data, comprising the steps of:

for each update operation, logging selectively to a soft log in a main storage and to a hard log in a non-volatile storage changes made to the data;

responsive to an error not involving loss of information in the soft log, restoring the data to their state at the beginning of the multi-row update operation in which the error occurs; and responsive to an error involving loss of information in said soft log, restoring the data to their state at the time of the savepoint recovery request related to the multi-row update operation in which the error occurs.

3. The method of claim 2, wherein the step of logging to the hard log changes made to the data includes the steps of:

recording in the hard log an identifier of the data being changed and an identifier of a resource manager making the change;

recording in the hard log selectively either information required to reserve a said update operation in order that it appears that the update operation was never performed, information required to re-perform a said update operation, or both such information; and responsive to an error involving loss of information in said soft log, restoring the data to their state at the beginning of the related recovery request by reference to the information required to reverse the update operation in which the error occurs in order that it appears that the operation was never performed.

4. A method for operating a computing apparatus including a database management system for updating, deleting, or inserting data in tables of a relational database, comprising the steps:

selectively updating the database in a multi-row update operation including update, insert, and delete;

recording in a hard log a record of the update operation if made to data where the data operated on are copied to a non-volatile storage; and recording in a soft log a record of the update operation if made to data where the data are not recoverable.

5. The method of claim 4 comprising the further steps:

recording a hard log savepoint request including a savepoint name at the beginning of the multi-row update operation in the tables of the relational database;

recording a soft log savepoint request at the beginning of the multi-row update operation wherein the soft log savepoint record includes the savepoint name, a pointer to the hard log savepoint record recorded for this multi-row update operation, and a list of entries including record identifiers of positions of the database to be saved; and responsive to a failure occurring during the multi-row update operation, restoring the table of the relational database multi-row update operation in which the error occurs to its state at the time of recording the savepoint request in the soft or hard log.

6. The method of claim 5 comprising the further steps:

obtaining from the soft log savepoint record the pointer of the hard log savepoint request and the entries of the positions of the database to be saved;

processing the hard log requests for information necessary to reserve an update operation in order that it appears that the operation was never performed from the point of the failure back to the hard log savepoint request; and restoring the positions of the database identified by the soft log savepoint request to their positions at the time the savepoint request was made.

* * * * *